Patented May 23, 1933

1,909,992

UNITED STATES PATENT OFFICE

HARRY M. WILLIAMS, OF DAYTON, OHIO, ASSIGNOR TO FRIGIDAIRE CORPORATION, OF DAYTON, OHIO, A CORPORATION OF DELAWARE

METHOD OF DETECTING LEAKS IN REFRIGERATING SYSTEMS

No Drawing. Original application filed June 30, 1927, Serial No. 202,768. Divided and this application filed January 31, 1930. Serial No. 425,076.

This invention relates to chemistry and particularly to testing apparatus suspected of leakage. It is especially but not exclusively concerned with refrigerants for apparatus of the compressor-condenser-expander type.

This application is a division of my co-pending application Serial No. 202,768, filed June 30, 1927.

One of the objects of the invention is to provide a method of detecting the presence of certain refrigerants, especially methyl chloride, more particularly to provide a positive and reliable method of testing apparatus for leaks and one which can easily and economically be practiced under quantity production conditions.

Another object is to treat refrigerants, such as methyl chloride, so as to render them easily detectable, without appreciably diluting them or impairing their refrigerating characteristics.

Other objects and advantages will be evident from the following description and claims.

In refrigerating apparatus of the compression type, refrigeration is produced by the evaporation of a volatile liquid, which after it is evaporated is liquefied by the apparatus and is again permitted to evaporate, thus producing either continuous or intermittent refrigeration as may be desired. Such apparatus usually includes a compressor and a condenser for liquefying the refrigerant and an evaporator in which the liquid vaporizes, the refrigerant being circulated in a cycle in the apparatus.

It has been known before my invention that methyl chloride has characteristics which render it particularly desirable as a refrigerant for certain refrigerating applications. But although methyl chloride is an excellent refrigerant, it has not come into any extended use and has proved extremely impracticable from a commercial standpoint, for the reason that heretofore no satisfactory method was known by which its presence could be detected and therefore no effective way could be provided for testing apparatus for leaks. It will be appreciated that it is essential for refrigerating apparatus of small commercial and household types to be quite free from leaks, even minute ones. Otherwise either the refrigerant will gradually escape or else air will gradually leak into the apparatus. In either event the apparatus will gradually produce less and less refrigerating effect, although it is apparently working perfectly in every other respect. Consequently it is necessary that the apparatus be thoroughly subjected to tests which will show the existence of the smallest leak before such apparatus is installed, and it will be appreciated that such tests must be of a simple nature and inexpensive to perform, especially where apparatus is manufactured under quantity production conditions.

I have discovered that sulphur dioxide can be mixed with methyl chloride and when so mixed renders the methyl chloride readily detectable. I therefore refer to the sulphur dioxide as a detectant, and by this term I mean a substance, which when added to or mixed with some other substance, renders the other substance detectable. I have discovered that a mixture of methyl chloride and sulphur dioxide having as little as 4% by volume, that is 6% by weight of $SO_2$ in $(CH_3ClSO_2)$ has a sufficiently pungent odor to be readily detected when present in appreciable quantities, and that even small quantities of such a mixture produce a white smoke in the presence of ammonia. This latter characteristic furnishes a simple and reliable test even for small leaks in refrigerating apparatus under quantity production conditions.

Refrigerating apparatus is ordinarily shipped from the factory sealed and charged under pressure with refrigerant. In accordance with my discovery, I charge the apparatus with a mixture of methyl chloride and sulphur dioxide, preferably having not less than 6% by weight of the latter. After the apparatus is so charged, a swab saturated with ammonia is passed over all parts which might possibly leak, such as castings, joints, valves, piping connections, seals and the like. If any leaks are present the mixture of methyl chloride and sulphur dioxide will come in contact with the ammonia and its presence will be indicated by the white smoke. Thus any leaks may be quickly and accurately located.

Sulphur dioxide and methyl chloride are miscible in all proportions, both in the liquid and gaseous phases, and from the standpoint of detectability, the exact proportions are immaterial. I refer to the proportion of sulphur dioxide used as a detectable proportion, by which I mean just enough and no more than is required to give a quick and reliable test for the presence of methyl chloride when ammonia is brought in contact with it. This detectable proportion is generally approximately six percent by weight, although it may be slightly greater or less. It is possible to detect mixture having less than 6% by weight of sulphur dioxide, but I prefer to use at least 6% because a smaller proportion is apt to make testing at under quantity production conditions difficult and unsatisfactory. It is of course desirable, if the exact characteristics of methyl chloride are to be preserved, to use as small a proportion of sulphur dioxide as testing requirements permit.

I have found that 6% of sulphur dioxide gives a reliable test and that this is a sufficiently small proportion that its presence does not materially change the vapor pressure characteristics of the methyl chloride, the mixture behaving substantially in the same way as pure methyl chloride for all practical refrigerating purposes. Less than 6% sulphur dioxide does not give a reliable test for leaks. On the other hand the proportion of sulphur dioxide may be increased within the limits of not materially affecting the vapor pressure characteristics of the methyl chloride. For example, if more than 20% sulphur dioxide is used, this is such a large proportion that the vapor pressure characteristics of the methyl chloride are seriously effected, the vapor pressure characteristics of this mixture being so far removed from those of methyl chloride that the mixture is unsuitable in applications where the vapor pressure characteristics of methyl chloride are desired.

Other refrigerants and other detectants may be combined in the manner indicated, the choice of refrigerant being regulated by the refrigerating characteristics desired and the choice of detectant being determined by the refrigerant employed. It is desirable that the detectant used with a particular refrigerant should also be a refrigerant in order that the refrigerant itself may not be unduly diluted. In the particular example chosen for the sake of illustration of this invention, the methyl chloride is of course primarily the refrigerant, but the sulphur dioxide is a refrigerant as well as a detectant.

While the particular substances and proportions herein disclosed are preferred, it is to be understood these have been stated for the sake of illustration merely and that other substances and/or proportions may be used within the scope of the invention.

What I claim is as follows:

1. The method of detecting leaks in a closed system containing methyl chloride which consists in introducing into the system approximately 6% by weight of sulphur dioxide and testing suspected leaks for the presence of sulphur dioxide.

2. The method of detecting leaks in a closed system containing methyl chloride which consists in introducing into the system sulphur dioxide in a quantity sufficient for detecting purposes but insufficient to substantially vary the vapor pressure characteristics of the methyl chloride, and testing suspected leaks for the presence of sulphur dioxide.

3. The method of detecting leaks in a closed system containing methyl chloride which consists in introducing into the system sulphur dioxide in a quantity sufficient for detecting purposes but insufficient to substantially vary the vapor pressure characteristics of the methyl chloride, and testing suspected leaks for the presence of sulphur dioxide by bringing ammonia adjacent the suspected leak.

4. The method of detecting leaks in a closed system containing an ordinarily non-detectable refrigerant which consists in introducing into the system a detectable refrigerant in a quantity sufficient for detecting purposes but insufficient to substantially vary the vapor pressure characteristics of the non-detectable refrigerant, and testing suspected leaks for the presence of the detectable refrigerant.

5. The method of detecting leaks in a closed system containing an ordinarily non-detectable refrigerant which consists in introducing into the system a detectable refrigerant in a quantity sufficient for detecting purposes but insufficient to substantially vary the vapor pressure characteristics of the non-detectable refrigerant, and testing suspected leaks for the presence of the detectable refrigerant by bringing adjacent the suspected leak a substance capable of giving a fuming test with the detectable refrigerant.

In testimony whereof I hereto affix my signature.

HARRY M. WILLIAMS.

Certificate of Correction

Patent No. 1,909,992.  May 23, 1933.

HARRY M. WILLIAMS.

It is hereby certified that error appears in the printed specification of the above-numbered patent requiring correction as follows: Page 1, line 80, for "($CH_3ClSO_2$)" read ($CH_3Cl+SO_2$); and that the said Letters Patent should be read with this correction therein that the same may conform to the record of the case in the Patent Office.

Signed and sealed this 8th day of August, A. D. 1933.

[SEAL.]  M. J. MOORE,
*Acting Commissioner of Patents.*